US010833987B2

(12) United States Patent
Wetterwald et al.

(10) Patent No.: US 10,833,987 B2
(45) Date of Patent: Nov. 10, 2020

(54) SUPPORTING ASYNCHRONOUS PACKET OPERATIONS IN A DETERMINISTIC NETWORK

(71) Applicant: Cisco Technology, Inc., San Jose, CA (US)

(72) Inventors: Patrick Wetterwald, Mouans Sartoux (FR); Eric Levy-Abegnoli, Valbonne (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/260,820

(22) Filed: Jan. 29, 2019

(65) Prior Publication Data
US 2020/0244576 A1  Jul. 30, 2020

(51) Int. Cl.
*H04L 12/801* (2013.01)
*H04L 12/741* (2013.01)
*H04L 12/721* (2013.01)
*H04L 12/865* (2013.01)
*H04L 12/823* (2013.01)

(52) U.S. Cl.
CPC ........... *H04L 45/74* (2013.01); *H04L 45/34* (2013.01); *H04L 45/44* (2013.01); *H04L 47/17* (2013.01); *H04L 47/32* (2013.01); *H04L 47/34* (2013.01); *H04L 47/6275* (2013.01)

(58) Field of Classification Search
CPC ......... H04L 45/74; H04L 45/34; H04L 47/17; H04L 47/32; H04L 47/6275; H04L 45/44; H04L 47/34; H04L 45/302; H04L 45/306; H04L 45/3065; H04L 45/308; H04L 47/20; H04L 47/28; H04L 47/627; H04L 47/80; H04L 47/801; H04L 47/803; H04L 47/805
See application file for complete search history.

(56) References Cited

U.S. PATENT DOCUMENTS 6,925,056 B1 *  8/2005  Lee ................... H04L 47/10
                                                    370/230
8,059,686 B2   11/2011  Bhandari et al.
(Continued)

OTHER PUBLICATIONS

Deterministic Networking (detnet), online: https://www.researchandmarkets.com/research/tmm42z/timesensitive, printed Sep. 2019, 5 pages, IETF.
(Continued)

*Primary Examiner* — Un C Cho
*Assistant Examiner* — Lalita W Pace
(74) *Attorney, Agent, or Firm* — Behmke Innovation Group LLC; Kenneth J. Heywood; James J. Wong (57) ABSTRACT

In one embodiment, a particular device along a path in a deterministic network receives a first packet sent from a source towards a destination via the path. The particular device sends the first packet to a next hop device along the path, according to a deterministic schedule associated with the first packet. The particular device determines, after sending the first packet, an action to be performed on the first packet. The particular device then sends a second packet to the next hop device indicative of the determined action. The second packet causes another device along the path to perform the action on the first packet.

20 Claims, 8 Drawing Sheets

(56) References Cited

U.S. PATENT DOCUMENTS

| | | | |
|---|---|---|---|
| 8,745,185 B1* | 6/2014 | Salo | H04L 63/0428 709/223 |
| 8,948,013 B1* | 2/2015 | Janarthanan | H04L 47/20 370/236 |
| 9,654,416 B2 | 5/2017 | Chandhoke et al. | |
| 2006/0274773 A1* | 12/2006 | Cohen | H04L 47/32 370/413 |
| 2007/0041364 A1* | 2/2007 | Kakadia | H04L 45/00 370/352 |
| 2007/0206621 A1* | 9/2007 | Plamondon | H04L 1/189 370/413 |
| 2011/0134748 A1* | 6/2011 | Spatscheck | H04L 1/0041 370/216 |
| 2017/0099351 A1 | 4/2017 | Bruckner et al. | |
| 2017/0289847 A1* | 10/2017 | Wetterwald | H04L 5/0055 |
| 2017/0324674 A1* | 11/2017 | Bergquist | H04L 47/14 |
| 2018/0041432 A1* | 2/2018 | Goetz | H04L 67/322 |
| 2018/0237039 A1* | 8/2018 | Mong | B61L 15/0081 |
| 2019/0215384 A1* | 7/2019 | Kfir | H04L 69/22 |
| 2019/0305892 A1* | 10/2019 | He | H04L 47/34 |

OTHER PUBLICATIONS

"Unified Architecture", OPC Foundation, Online: https://opcfoundation.org/about/opc-technologies/opc-ua/, printed Sep. 2019, 3 pages.

Finn, Norman, "Time-Sensitive and Deterministic Networking", mentor.ieee.org, Jul. 2017, 24 pages. IEEE.

Geng, et al., "Requirements of Layer 3 Deterministic Latency Service", <draft-geng-detnet-requirements-bounded-latency-03>, Internet Draft, Jul. 2018, 6 pages, IETF Trust.

Kropotov, et al., "On the Transmission of Asynchronous Data Streams Over Packet Switched Networks with Random Multiple Access", International Journal of Computer Networks and Communications (IJCNC), vol. 10, No. 1, Jan. 2018, pp. 107-117.

Laursen, et al., "Routing Optimization of AVB Streams in TSN Networks", ACM SIGBED Review, Special Issue on 14th International Workshop on RealTime Networks (RTN 2016), vol. 13, No. 4, Sep. 2016, pp. 43-48, ACM.

Meyer, et al., "Extending IEEE 802.1 AVB with Time-Triggered Scheduling: A Simulation Study of the Coexistenceo f Synchronous and Asynchronous Traffic", 2013 IEEE Vehicular Networking Conference, Boston, MA, Dec. 2013, 8 pages, IEEE.

Nasrallah, et al., "Ultra-Low Latency (ULL) Networks: The IEEE TSN and IETF DetNet Standards and Related 5G ULL Research" IEEE Communications Surveys & Tutorials, vol. 21, No. 1, 2019, pp. 88-145, IEEE.

Sajassi, et al., "BGP MPLS Based Ethernet VPN" <draft-ietf-l2vpn-evpn-11>, Internet Draft, Oct. 2014, 52 pages, IETF Trust.

Thubert, P., "An Architecture for IPv6 Over the TSCH Mode of IEEE 802.15.4" <draft-ietf-6tisch-artchitecture-14>, Internet Draft, Apr. 2018, 57 pages, IETF Trust.

* cited by examiner

SUPPORTING ASYNCHRONOUS PACKET OPERATIONS IN A DETERMINISTIC NETWORK

TECHNICAL FIELD

The present disclosure relates generally to computer networks, and, more particularly, to supporting asynchronous packet operations in a deterministic network.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

In current industrial Internet and power automation deployments, specific forms of packet operations may be mandatory. For example, certain network deployments may apply firewall services to packets, for purposes of network isolation. In another example, some networks may append a specific header or field to packets in the network. These and other forms of packet operations typically require movement of the packet to the CPU of the switch, firewall, or other device, to perform the action. However, the amount of time needed to perform the action can be variable, making these types of "asynchronous" actions incompatible with traditional deterministic networking techniques.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a particular device along a path in a deterministic network receives a first packet sent from a source towards a destination via the path. The particular device sends the first packet to a next hop device along the path, according to a deterministic schedule associated with the first packet. The particular device determines, after sending the first packet, an action to be performed on the first packet. The particular device then sends a second packet to the next hop device indicative of the determined action. The second packet causes another device along the path to perform the action on the first packet.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
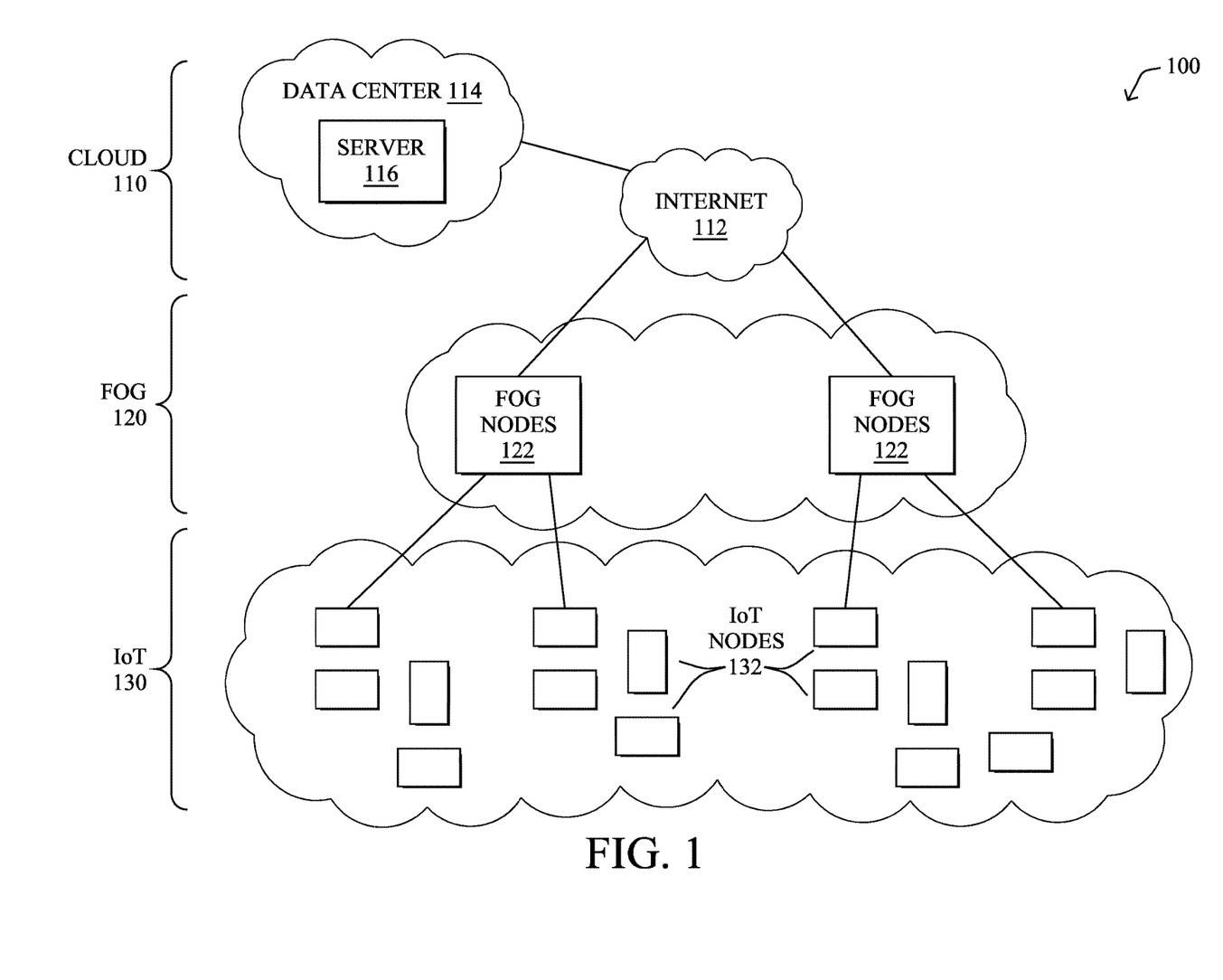
FIG. 1 illustrates an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc . . . ), PLC protocols, or other shared-media protocols where appropriate. In this context, a protocol consists of a set of rules defining how the nodes interact with each other.

Figure 2:
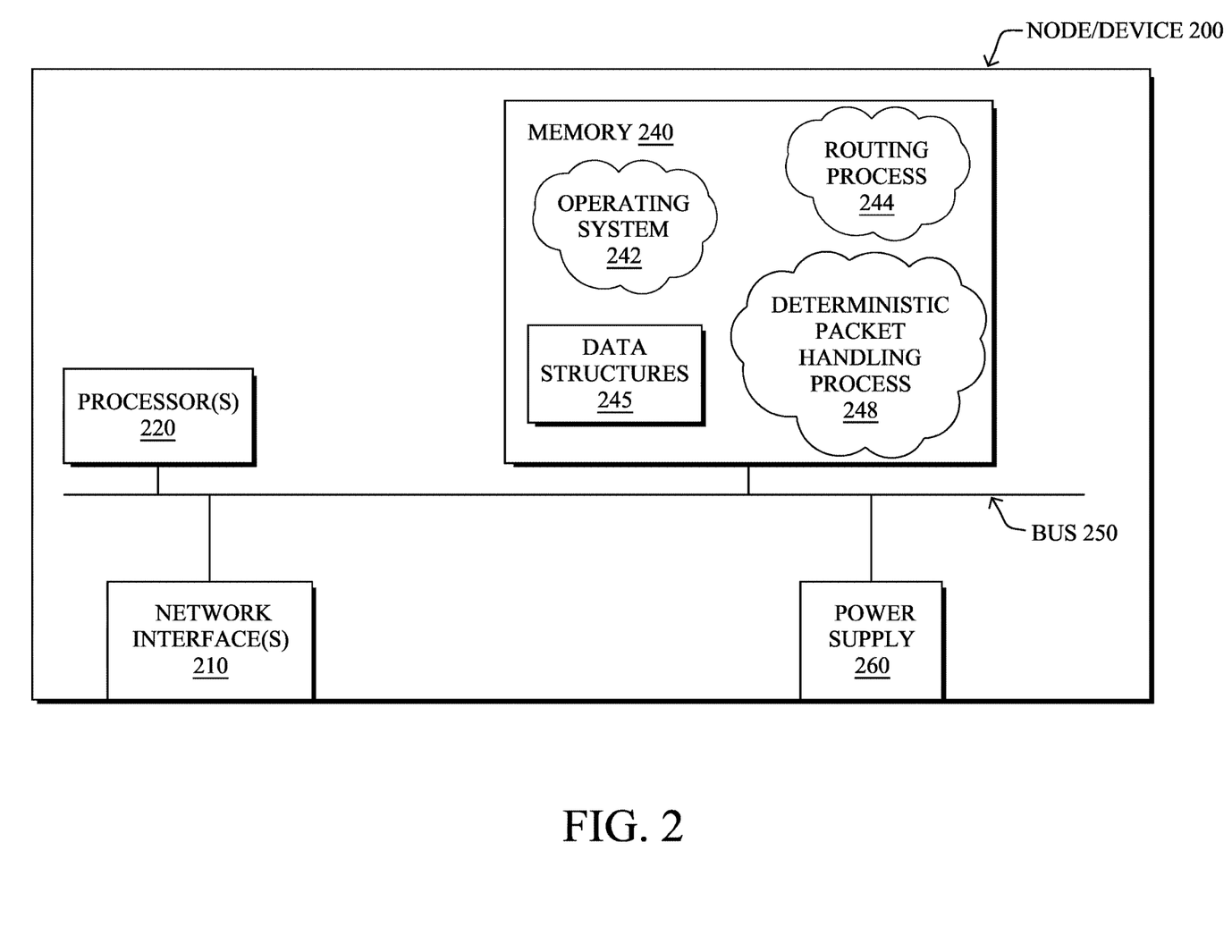
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a deterministic packet handling process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

According to various embodiments, node/device 200 may communicate deterministically within a network. Notably, many low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE 802.15.4 may thus be adapted to support determinism. In particular, the bandwidth can be pre-formatted in a time division multiplexing (TDM) fashion using IEEE 802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a path computation engine (PCE) with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol. The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery). Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

Example standards for deterministic networking/TSN include, but are not limited to, Institute of Electrical and Electronics Engineers (IEEE) 802.1Qca, 802.1Qbv, 802.1Qbu/ 802.3br, 802.1Qch, 802.1AS-Rev, 1588 v2, 802.1Qcc, 802.1Qci, 802.1CB, and 802.1CM Likewise, the Internet Engineering Task Force (IETF) has established a deterministic network (DetNet) working group to define a common deterministic architecture for Layer 2 and Layer 3. Further standards for deterministic networking also include OPC Unified Architecture (UA) from the OPC Foundation, as well as the International Electrotechnical Commission (IEC) 61850-90-13 and MT-9 standards. As would be appreciated, the deterministic networking standards listed above are exemplary only and the techniques herein can be used with any number of different deterministic networking protocols.

As noted above, deterministic networking represents recent efforts to extend networking technologies to industrial settings. Indeed, industrial networking requires having predictable communications between devices. For example, consider a control loop in which a controller controls an actuator, based on a reading from a sensor. In such a case, a key requirement of the network may be the guarantee of packets being delivered within a bounded time. This translates into the following characteristics needed by a typical deterministic network:

High delivery ratio (e.g., a loss rate of $10^{-5}$ to $10^{-9}$, depending on the application)

Fixed latency

Jitter close to zero (e.g., on the order of microseconds)

A limited degree of control can be achieved with QoS tagging and shaping/admission control. For time sensitive flows, though, latency and jitter can only be fully controlled with the effective scheduling of every transmission at every hop. In turn, the delivery ratio can be optimized by applying 1+1 packet redundancy, such as by using High-availability Seamless Redundancy (HSR), Parallel Redundancy Protocol (PRP), or the like, with all possible forms of diversity, in space, time, frequency, code (e.g., in CDMA), hardware (links and routers), and software (implementations).

Deterministic Ethernet and deterministic wireless generally utilize a communication scheduling mechanism (e.g., as computed by a supervisory device, such as a PCE) that requires the internal clocks of the nodes/devices along a network path to be synchronized. To do so, a time synchronization protocol, such as the Network Time Protocol (NTP) or Precision Time Protocol (PTP) can be used to effect clock synchronization among the network devices. The degree of clock precision among the devices often needs to be within microseconds or less.

The forwarding of each packet is then regulated by a deterministic communication schedule that specifies when the packet has to be transmitted to the wire or radio. This is done for each node/device along the network path. The specific time period is called a time slot. A supervisory device, sometimes referred to as the "orchestrator," usually performs the computation of this path and the associated timetable. Such an approach is akin to a PCE in MPLS networks, in order to compute Traffic Engineering Label Switched Paths, with the major difference being that a time schedule is computed instead of simply a constrained shortest path (e.g., the path in a deterministic network having both spatial and temporal aspects).

When the supervisory device completes computation of the deterministic communication schedule, it may then download the path and the timetable to each of the devices participating in the forwarding. In turn, these nodes will then begin receiving and sending packets according to the computed schedule. When more packets arrive in a given time interval than scheduled, a deterministic node/device will protect itself and declassify or drop packets. Accordingly, one potential timing issue that may occur in a deterministic network is the loss of timeliness (e.g., a packet not arriving at its destination within its scheduled time interval, as opposed to classical congestion loss.

Deterministic networking is a fundamental component of the IoT and can be used in a number of different use cases, ranging from industrial automation to inflight control systems to internal vehicle networking. Most of these application fields are mission critical and require very strict control in terms of timing.

As noted above, however, certain packet operations can be very detrimental in a deterministic network that uses traditional techniques. Notably, actions such as processing packets by a firewall, making changes to the header(s) or field(s) of the packets, and the like, often require variable amounts of time to complete. This variability can lead to situations in which the device handling the packet is unable to complete the operation with respect to the packet, prior to when the device must forward the packet onward, according to its deterministic schedule.

Supporting Asynchronous Packet Operations in a Deterministic Network

The techniques herein allow for the performance of asynchronous packet operations to be performed in a deterministic network. In some aspects, computations regarding a packet can be performed asynchronously with the sending of the packet along a deterministic network path. The result of the computation may then be sent to a rendezvous point so as to arrive in conjunction with the packet, thereby allowing the receiving device to perform the corresponding packet operation on the packet. Such an action may entail, for example, dropping the packet prior to delivery to the destination, or modifying the packet in some way (e.g., adding a checksum, cryptographic information, etc.). In further aspects, the scheduling of the transmission of the packet along the deterministic network path may be performed in such a way so as to slow down the sending of the packet along the path, to allow a second packet carrying the results of the computation to catch up with the initial packet.

Specifically, according to one or more embodiments of the disclosure as described in detail below, a particular device along a path in a deterministic network receives a first packet sent from a source towards a destination via the path. The particular device sends the first packet to a next hop device along the path, according to a deterministic schedule associated with the first packet. The particular device determines, after sending the first packet, an action to be performed on the first packet. The particular device then sends a second packet to the next hop device indicative of the determined action. The second packet causes another device along the path to perform the action on the first packet.

Illustratively, the techniques described herein may be performed by hardware, software, and/or firmware, such as in accordance with the deterministic packet handling process 248, which may include computer executable instructions executed by the processor 220 (or independent processor of interfaces 210) to perform functions relating to the techniques described herein, e.g., in conjunction with routing process 244.

Figure 3A:
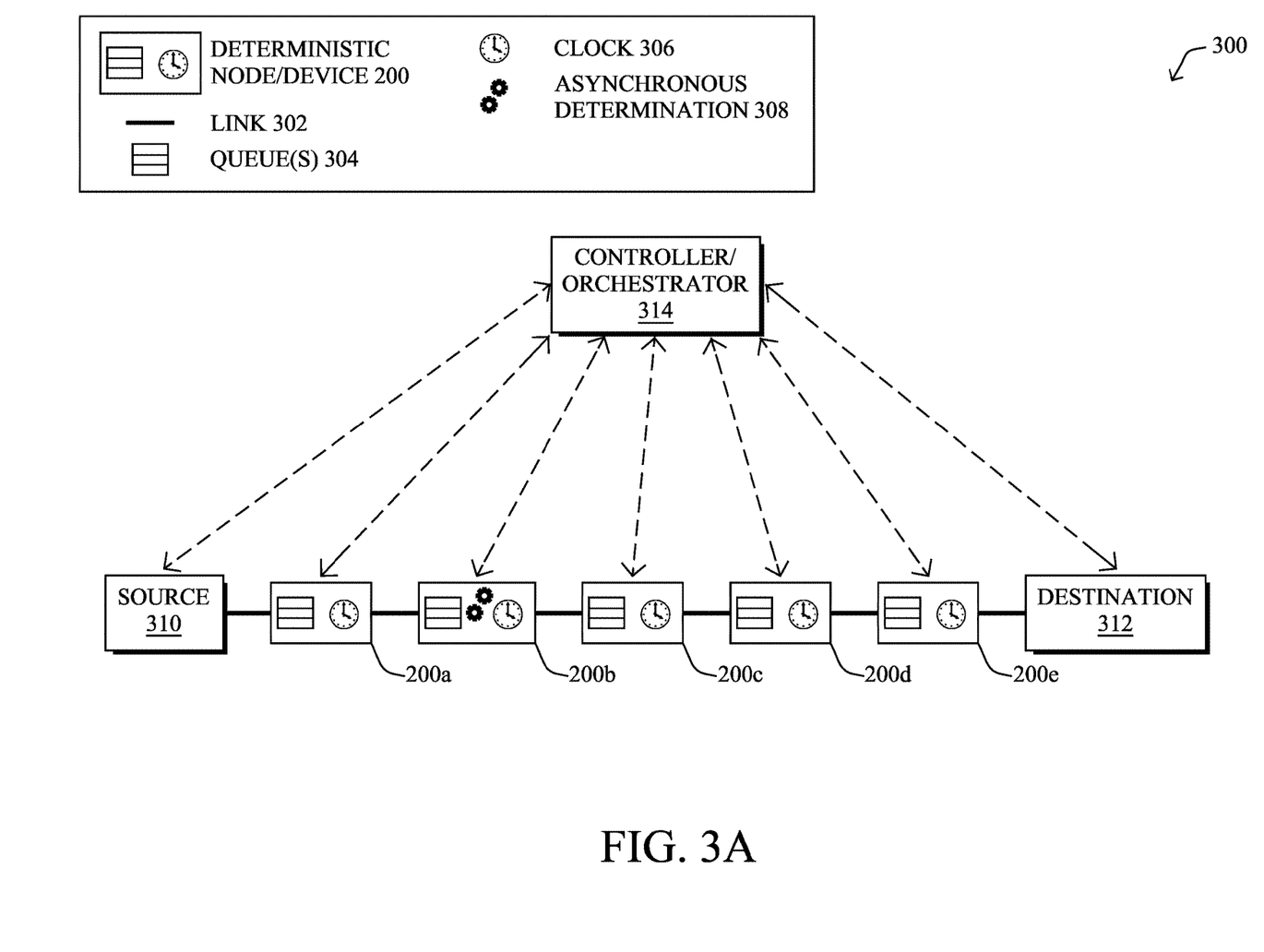
FIGS. 3A-3D illustrate an example of supporting asynchronous packet operations in a deterministic network.

Operationally, FIGS. 3A-3D illustrate an example of supporting asynchronous packet operations in a deterministic network 300. As shown in FIG. 3A, assume that deterministic network 300 comprises a source 310 that may send one or more packets via deterministic network 300 to a destination 312. Separating source 310 and destination 312 may be any number of deterministic nodes/devices 200 located along a path that are interconnected via links 302. For example, nodes/devices 200a-200e shown may comprise any number of networking devices, such as switches, routers, or the like. As would be appreciated, links 302 may be hardwired links (e.g., Ethernet, etc.) or, alternatively, wireless links among the nodes/devices 200, as well as source 310 and destination 312.

By definition, delivery of any packets from source 310 to destination 312 in a deterministic manner requires that the packets be delivered to destination 312 within a very bounded timeframe. To do so, each node/device 200 may include any number of transmission queues 304, as well as an internal clock 306. Whenever a node/device 200 receives one of the packets sent by source 310, it may place the packet into one of its transmission queues 304 and send the packet on to the next hop along the path, in accordance with a deterministic schedule for the path computed by a supervisory controller/orchestrator 314. For example, the schedule may place very strict time budgets on each of the nodes/devices 200 along the path that dictate how long each has to send the packet on to the next hop along the path. In other words, to ensure that the packet is delivered to destination 312 within its bounded time, each node 200 must send the packet onward down the path within a scheduled timeframe.

To synchronize the internal clocks 306 of nodes/devices 200a-200e, controller/orchestrator 314 may also function as a "master clock" that serves as a reference clock to which clocks 308 may be synchronized. For example, controller/orchestrator 314 may promulgate clock synchronization protocol messages (e.g., NTP or PTP messages) to nodes/devices 200a-200e.

As noted above, an asynchronous packet operation can impinge on the ability of a path in a deterministic network to deliver a packet within its bounded delivery time. In general, these operations entail two steps: 1.) determining an action to take, if any, based on the packet information and 2.) performing the action on the packet. For example, a firewall may assess packet information, such as the source and destination addresses and/or ports, the protocols in use, or the like, to determine whether to allow or deny delivery of the packet from source 310 to destination 312. If the determination indicates that delivery of the packet to destination 312 should be blocked, the corresponding action would then be to drop the packet. However, the strict time constrains enforced by the deterministic schedule may not allow for either or both to occur, before the processing device has to send the packet on to the next hop along the path.

According to various embodiments, the device(s) that perform an asynchronous operation with respect to a packet may be configured to participate as deterministic nodes along the path between the source and destination of a packet. For example, as shown, assume that node/device 200b is a firewall or other networking device that performs asynchronous determination 308 with respect to a given packet. In such a case, node/device 200b may still perform the deterministic networking functions detailed above, in addition to performing asynchronous determination 308 with respect to the processed packets. Said differently, regardless of its device type, node/device 200b may still function as a deterministic node under the supervision of controller/orchestrator 314.

Even though the time that node/device 200b takes to complete asynchronous determination 308 may vary, it is still likely bounded within a certain execution timeframe. In one embodiment, controller/orchestrator 314 may take this execution information into account when computing the deterministic path between source 310 and destination 312, as well as computing the corresponding deterministic schedule.

Figure 3B:
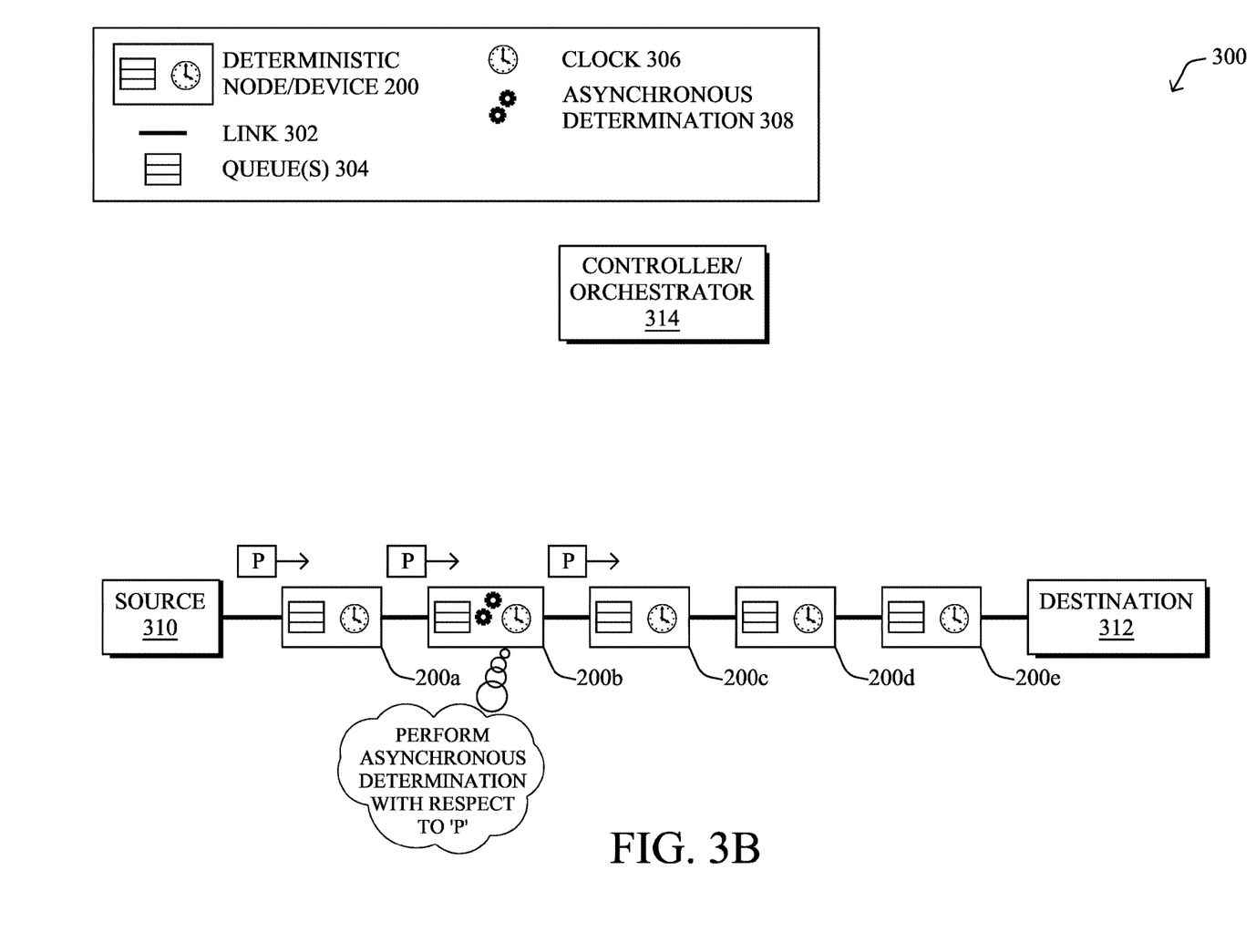

As shown in FIG. 3B, assume that source 310 has sent a packet 'P' along the deterministic networking path towards destination 312. When node/device 200b receives packet P, node/device 200b needs to perform the following:

1.) Performance of asynchronous determination 308 with respect to packet P. Typically, this is performed by the CPU of the device.
2.) Forwarding packet P on to the next hop along the path, node 200c, in accordance with the deterministic schedule associated with the packet, as computed by controller/orchestrator 314. Note that this is typically performed in specialized hardware of the device and the execution time is fixed, unlike asynchronous determination 308.

According to various embodiments, performance of asynchronous determination 308 with respect to packet P may be decoupled from the deterministic forwarding of packet P along the network path. For example, assume that asynchronous determination 308 will take longer than the time allotted to node/device 200b to forward packet P on to node/device 200c. In such a case, node/device 200b may forward packet P onward, while still processing asynchronous determination 308. Of course, if the budgeted amount of time for node/device 200b exceeds the time needed to perform asynchronous determination 308, and potentially any resulting actions, node/device 200b may simply act on packet P, directly.

Figure 3C:
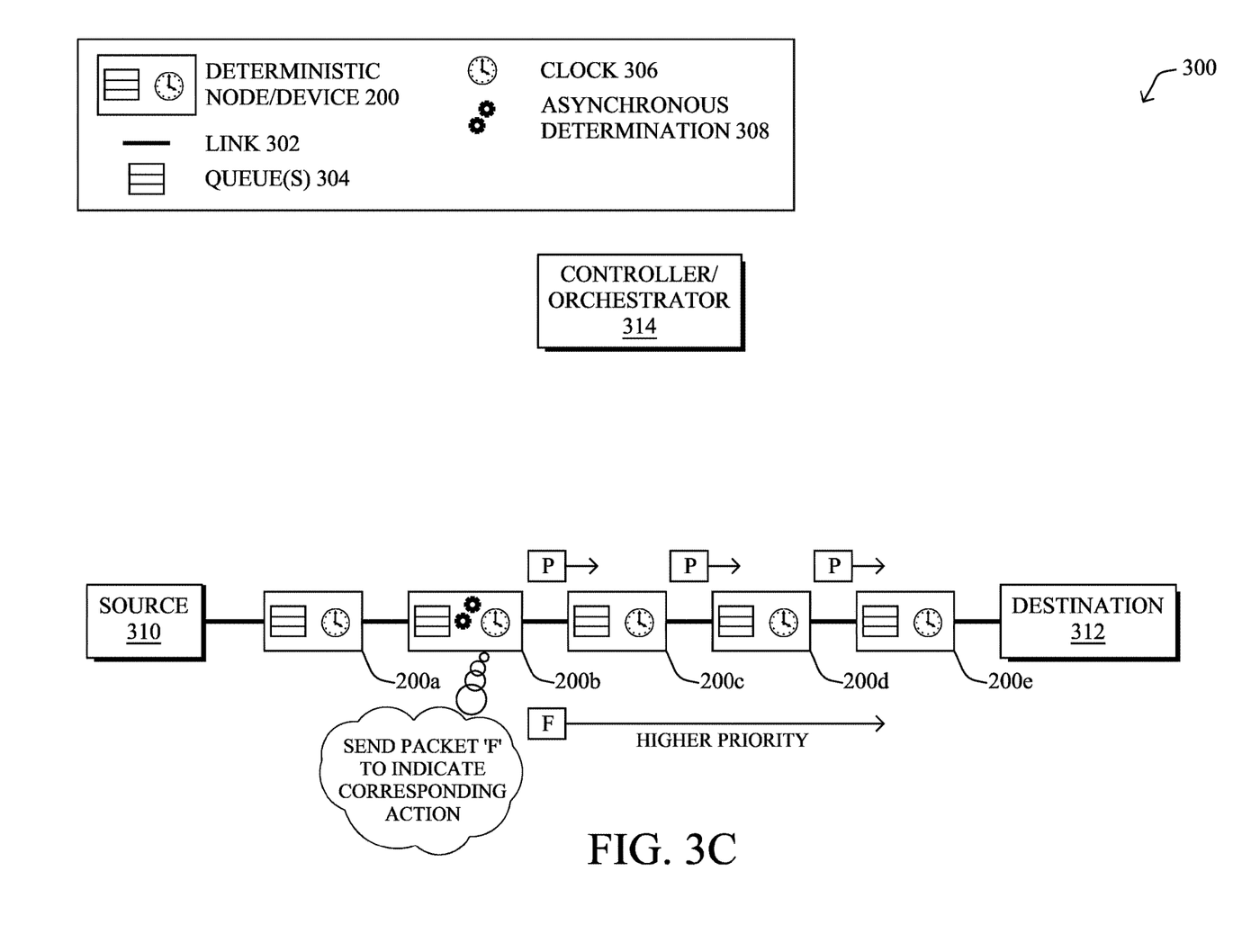

As shown in FIG. 3C, assume that node/device 200b has forwarded packet P on to node/device 200c and, in turn, packet P is forwarded on to the next hop of node/device 200c, node/device 200d. It should be noted that the transmission of a packet along a deterministic networking path may be made voluntarily slow, by holding the packet in a time-triggered transmission queue of a forwarding node/device. Indeed, as long as the packet is transferred within the end-to-end latency budget for delivery to the destination, the deterministic mechanism operates properly. In some embodiments, this property can be leveraged within network 300, to afford additional time for completion of the asynchronous operation, which is not possible in traditional deterministic networks that take a 'hot potato' approach to packet forwarding.

While packet P continues to be forwarded along the path according to its deterministic schedule, assume now that node/device 200b has completed asynchronous determination 308. If the determination is that no action is needed with respect to packet P, node/device 200b may deem the asynchronous operation complete and packet P may be delivered to destination 312 as normal. However, assume that node/device 200b determines that a certain action should be performed on packet P, such as dropping the packet before delivery to destination 312 or modifying a header or field of packet P.

In various embodiments, to effect performance of an asynchronous action on packet P, node/device 200b may send a second packet, packet 'F,' along the same path as that of packet P, with the intent of packet F catching up to packet P, prior to delivery of packet P to destination 312. In general, packet F may have a very minimal payload and indicate the action to be performed on packet P, as determined by asynchronous determination 308. In one embodiment, to ensure that packet F reaches the same device processing packet P in time to perform the action, node/device 200 may send packet F along the deterministic path with a higher priority than that of packet P.

When a node/device 200 receives packet F, it may check its queue(s) 304 for packet P and, if found, perform the indicated action on packet P. For example, in TSN, each packet is identified by its flow identifier (FlowID) and sequence number. In one embodiment, packet F may include the FlowID and sequence number of packet P, to allow the processing node/device 200 to match the action indicated by packet F with packet P still located in its queue 304.

Figure 3D:
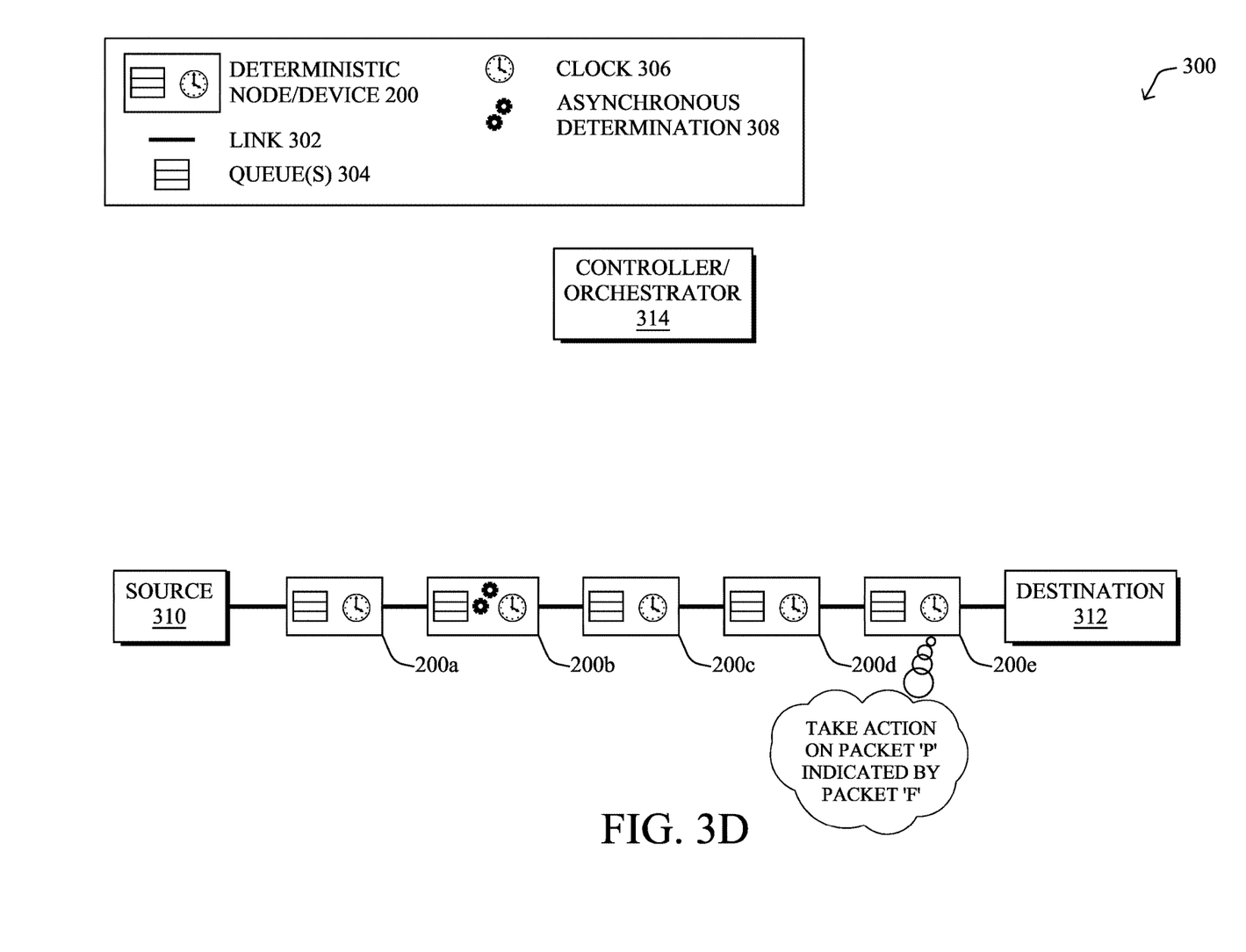

For example, as shown in FIG. 3D, assume that packet F arrives at node/device 200e, while packet P is still in one of queues 304 of node/device 200e. In such a case, node/device 200e may perform the action specified by packet F on packet P, prior to performance of any forwarding of packet P by node/device 200e. This may be coupled with any slowing down of packet P along the path after node/device 200b, as described above. By doing so, this ensures that the complete asynchronous packet operation is performed on packet P, prior to delivery of packet P to destination 312, while still satisfying the deterministic networking constraints.

Note, however, that a key requirement of the techniques herein is that the time needed to complete the full asynchronous operation on the packet cannot exceed amount of time needed to deliver the packet on time. In addition, any changes in the asynchronous operation to be performed on a traffic flow may require controller/orchestrator 314 to re-compute the deterministic path and schedule for the flow. For example, if a firewall rule is changed on node/device 200b that affects a certain set of packets, this change may be communicated to controller/orchestrator 314, to ensure that the rule can still be enforced prior to delivery of the affected packets by network 300.

Figure 4:
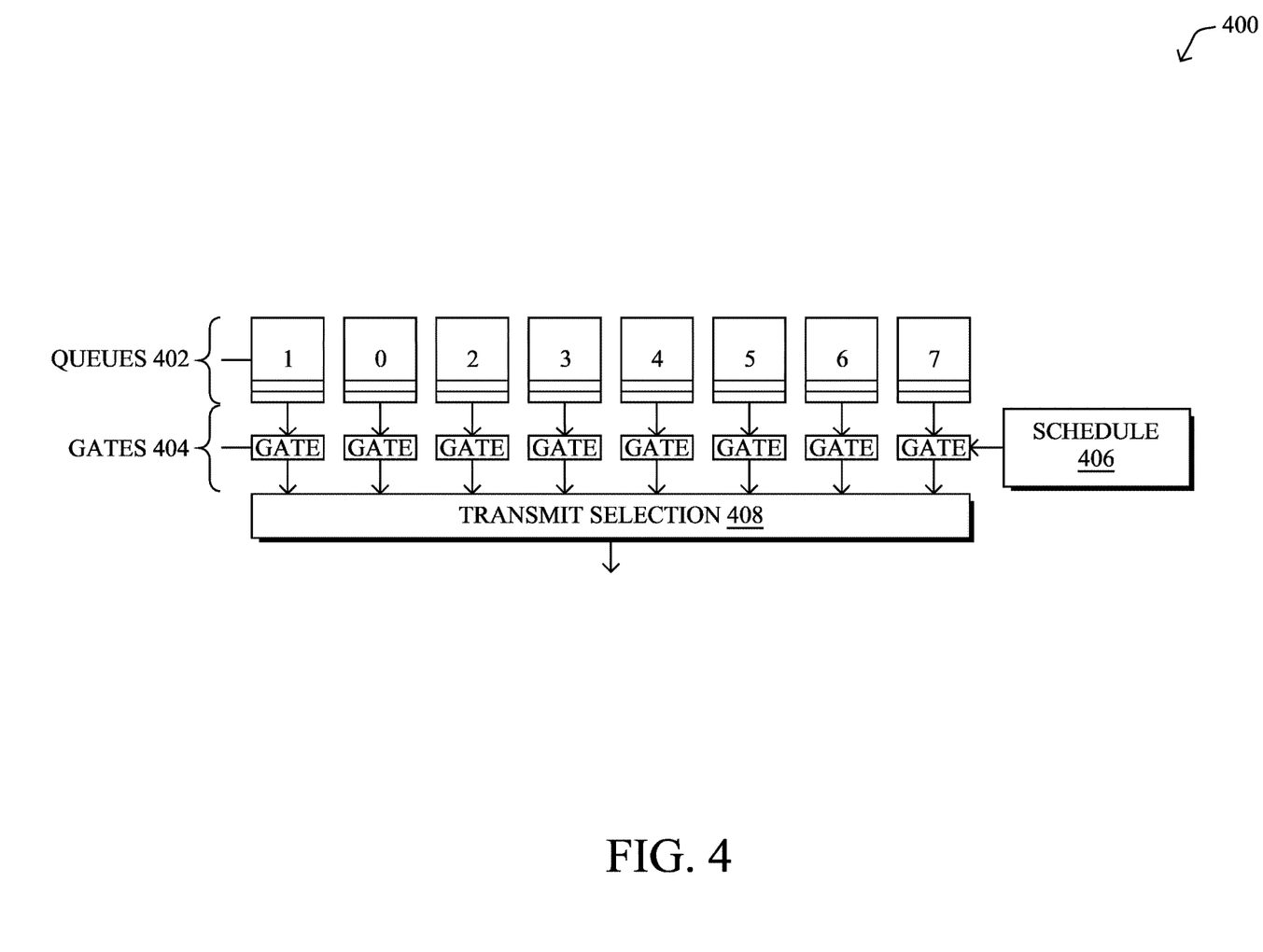
FIG. 4 illustrates an example queue architecture for a device in a deterministic network.

Prioritization of the second packet that indicates the action to be performed on the first packet can be achieved in any number of ways. For example, in 802.1Qbv, the way to give priority to the action item packet may be to assign a specific queue in the deterministic node/device with a schedule that will give better access to the media. FIG. 4 illustrates an example queue architecture 400 for a device in a deterministic network, according to some embodiments.

As shown in FIG. 4, the deterministic node/device may include any number of transmission queues 402 into which packets may be placed. From queues 402, the node/device may make a transmit selection 408, to send a particular packet from one of queues 402 via an outgoing interface of the node/device. According to various embodiments, each transmission queue may have an associated gate 404, whose operation may be controlled according to a schedule 406. By assigning the action item packet (e.g., packet F in FIGS. 3C-3D) to a specific queue 402 with an appropriate schedule 406, the action item packet can be sent in a prioritized manner over that of other packets, thereby allowing the action item packet to catch up with the initial packet (e.g., packet P in FIGS. 3B-3D) for performance of the indicated action.

Figure 5:
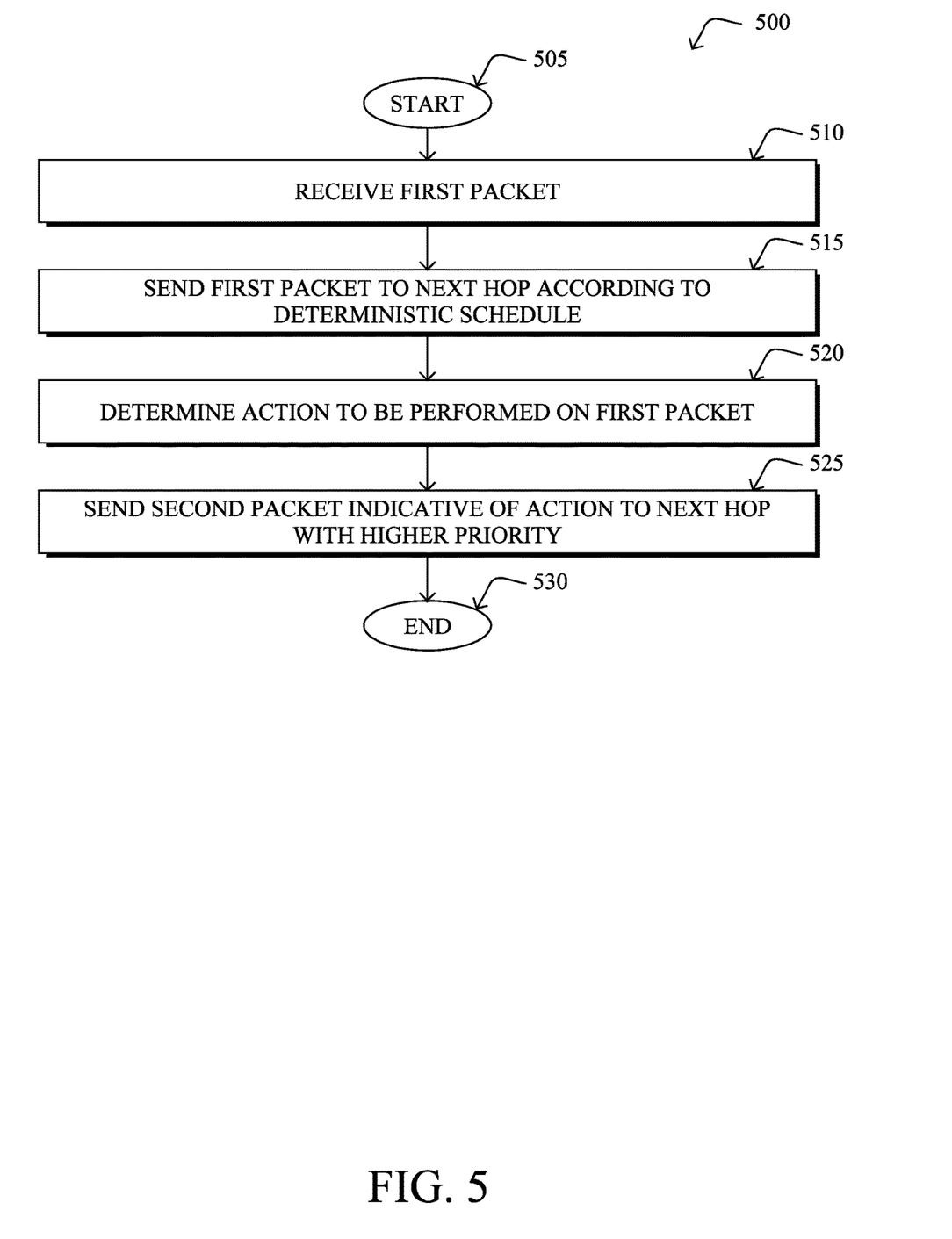
FIG. 5 illustrates an example simplified procedure for supporting asynchronous packet operations in a deterministic network.

FIG. 5 illustrates an example simplified procedure for supporting asynchronous packet operations in a deterministic network, in accordance with one or more embodiments described herein. For example, a non-generic, specifically configured device (e.g., device 200) located along a path in a deterministic network may perform procedure 500 by executing stored instructions (e.g., process 248). The procedure 500 may start at step 505, and continues to step 510, where, as described in greater detail above, the particular device may receive a first packet sent from a source towards a destination via the path.

At step 515, as detailed above, the particular device may send the first packet to a next hop device along the path, according to a deterministic schedule associated with the first packet. For example, the device may receive a deterministic schedule computed by a supervisory controller/orchestrator that dictates how long the device has to send the packet on to the next hop along the deterministic path.

At step 520, the particular device may determine, after sending the first packet on to the next hop, an action to be performed on the first packet, as described in greater detail above. In various embodiments, the device may begin making the determination asynchronously with the performance of step 515. For example, the device may begin making the determination, prior to sending the first packet on to the next hop along the deterministic path, but only complete the determination after the first packet has been sent. This is typically the case in which the device uses its CPU to make the determination, based on the characteristics of the packet, whereas packet forwarding is performed by specialized hardware of the device. In various embodiments, the determined action may include, but is not limited to, dropping or otherwise changing treatment of the first packet along the path, modifying the first packet (e.g., adjusting a header or field of the first packet), or any other action that is to be performed on the packet, prior to delivery of the packet to its destination. For example, if the device is a At step 525, as detailed above, the particular device may send a second packet to the next hop device indicative of the determined action. In various embodiments, the second packet causes another device along the path to perform the action on the first packet. For example, if the particular device is a firewall that determines that the first packet should be dropped, prior to delivery to the destination, the second packet may identify the first packet and the determined action to be performed. In one embodiment, the particular device may include the flow identifier and sequence number of the first packet in the second packet. By doing so, any of the other devices along the path, including the next hop of the particular device, can determine whether the first packet is in one of its transmission queues by matching the flow identifiers and sequence numbers. In turn, the other device may perform the action indicated by the second packet. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allows for the performance of certain operations on a packet in a deterministic network that could not be performed by a single device, otherwise. In particular, the techniques herein allow for the packet to continue to be forwarded along a deterministic network path, while the decision is made as to whether an action should be performed on the packet. If so, the techniques herein also provide for signaling along the path to perform the action, prior to delivery of the packet to its destination.

While there have been shown and described illustrative embodiments that provide for supporting asynchronous packet operations in a deterministic network, it is to be understood that various other adaptations and modifications may be made within the spirit and scope of the embodiments herein. For example, while certain protocols are shown, such as 6TiSCH, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a particular device located along a path in a deterministic network, a first packet sent from a source towards a destination via the path;
sending, by the particular device, the first packet to a next hop device along the path, according to a deterministic schedule associated with the first packet;
determining, by the particular device and after sending the first packet, an action to be performed on the first packet, wherein the action comprises dropping the first packet; and
sending, by the particular device, a second packet to the next hop device indicative of the determined action, wherein the second packet causes another device along the path to perform the determined action on the first packet.

2. The method as in claim 1, wherein the determined action further comprises an adjustment to a header or field of the first packet.

3. The method as in claim 1, wherein sending the second packet to the next hop device indicative of the determined action comprises:
sending the second packet indicative of the determined action with a higher priority than that of the first packet, to catch up with the first packet during transmission along the path and prior to delivery to the destination.

4. The method as in claim 1, wherein sending the second packet to the next hop device indicative of the determined action comprises:
including a flow identifier and sequence number from the first packet in the second packet.

5. The method as in claim 1, wherein the particular device is a firewall.

6. The method as in claim 1, wherein the other device along the path performs the determined action on the first packet in part by determining that the first packet is in one of its transmit queues based on the second packet.

7. The method as in claim 1, wherein the next hop device prioritizes the second packet by assigning the second packet to a specific transmit queue of the next hop device with an associated schedule that prioritizes sending of the second packet along the path.

8. The method as in claim 1, wherein the next hop device along the path is the other device along the path that performs the action on the first packet.

9. The method as in claim 1, wherein the deterministic schedule associated with the first packet causes the next hop device to hold the first packet for a longer time than that of the particular device.

10. An apparatus, comprising:
one or more network interfaces to communicate with a deterministic network;
a processor coupled to the one or more network interfaces and adapted to execute one or more processes; and
a memory configured to store a process executable by the processor, the process when executed configured to:
receive a first packet sent from a source towards a destination via a path;
send the first packet to a next hop along the path, according to a deterministic schedule associated with the first packet;
determine, after sending the first packet, an action to be performed on the first packet, wherein the action comprises dropping the first packet; and
send a second packet to the next hop indicative of the determined action, wherein the second packet causes a device along the path to perform the action on the first packet.

11. The apparatus as in claim 10, wherein the determined action further comprises an adjustment to a header or field of the first packet.

12. The apparatus as in claim 10, wherein the apparatus sends the second packet to the next hop indicative of the determined action by:
sending the second packet indicative of the determined action with a higher priority than that of the first packet, to catch up with the first packet during transmission along the path and prior to delivery to the destination.

13. The apparatus as in claim 10, wherein the apparatus sends the second packet to the next hop indicative of the determined action by:
including a flow identifier and sequence number from the first packet in the second packet.

14. The apparatus as in claim 10, wherein the apparatus is a firewall-.

15. The apparatus as in claim 10, wherein the device along the path performs the determined action on the first packet in part by determining that the first packet is in one of its transmit queues based on the second packet.

16. The apparatus as in claim 10, wherein the next hop prioritizes the second packet by assigning the second packet to a specific transmit queue of the next hop device with an associated schedule that prioritizes sending of the second packet along the path.

17. The apparatus as in claim 10, wherein the next hop along the path is the other device along the path that performs the action on the first packet.

18. The apparatus as in claim 10, wherein the deterministic schedule associated with the first packet causes the next hop to hold the first packet for a longer time than that of the apparatus.

19. A tangible, non-transitory, computer-readable medium storing program instructions that cause a particular device located along a path in a deterministic network to execute a process, the process comprising:
- receiving, at the particular device, a first packet sent from a source towards a destination via the path;
- sending, by the particular device, the first packet to a next hop device along the path, according to a deterministic schedule associated with the first packet;
- determining, by the particular device and after sending the first packet, an action to be performed on the first packet, wherein the action comprises dropping the first packet; and
- sending, by the particular device, a second packet to the next hop device indicative of the determined action, wherein the second packet causes another device along the path to perform the determined action on the first packet.

20. The computer-readable medium as in claim 19, wherein the determined action further comprises at least one of: adjusting a header of the first packet or, adjusting a field of the first packet.

* * * * *